US012729840B1

(12) United States Patent
Zhao et al.

(10) Patent No.: US 12,729,840 B1
(45) Date of Patent: Sep. 8, 2026

(54) WALL WASH INSERT FOR RECESSED LIGHTING

(71) Applicant: SIGNIFY HOLDING B.V., Eindhoven (NL)

(72) Inventors: Wei Zhao, Shanghai (CN); William Randolph Johnson, Jr., Peachtree City, GA (US); Russell Bryant Green, Peachtree City, GA (US); Wilston Nigel Christopher Sayers, Peachtree City, GA (US); Zhihong Lin, Shanghai (CN); Kyle Talmadge Lowery, Peachtree City, GA (US); Ramanand Radhkrishna Kamath, Peachtree City, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 19/096,797

(22) Filed: Apr. 1, 2025

(51) Int. Cl.
*F21V 21/04* (2006.01)
*F21S 8/02* (2006.01)
*F21V 5/04* (2006.01)
*F21V 17/06* (2006.01)
*F21Y 115/10* (2016.01)

(52) U.S. Cl.
CPC ............ *F21V 21/049* (2013.01); *F21S 8/026* (2013.01); *F21V 5/045* (2013.01); *F21V 17/06* (2013.01); *F21Y 2115/10* (2016.08)

(58) Field of Classification Search
CPC ........ F21V 21/049; F21V 5/045; F21V 17/06; F21V 21/04; F21V 21/041; F21V 21/042; F21V 21/043; F21V 21/044; F21V 21/045; F21V 21/046; F21V 21/047; F21V 21/048; F21S 8/026; F21Y 2115/10
See application file for complete search history.

(56) References Cited

U.S. PATENT DOCUMENTS

| | | | | | |
|---|---|---|---|---|---|
| 5,124,901 | A * | 6/1992 | Sojka | F21V 21/04 | 362/148 |
| 6,095,669 | A * | 8/2000 | Cho | F21S 8/026 | 362/147 |
| 2013/0322091 | A1* | 12/2013 | Honeycutt | F21V 17/04 | 362/319 |
| 2014/0063812 | A1* | 3/2014 | Geralds | F21V 7/10 | 362/350 |

(Continued)

FOREIGN PATENT DOCUMENTS

CN 208331933 U 1/2019

*Primary Examiner* — Bao Q Truong

(57) ABSTRACT

A wall wash insert is described here that includes a wall wash housing with a truncated conal shape, where the conal shape is truncated at a top by a circular ridge and on a side and bottom by an elliptical opening. The wall wash insert may be configured to be inserted in a round recessed lighting unit. The elliptical opening may extend from the circular ridge to the bottom of the conal shape at the opposite side. The circular ridge may include a cylinder, open at each end, at the top of the wall wash housing, and a plurality of clips. A lens may cover the elliptical opening, the lens including a lined diffusion pattern and a plurality of raised tabs located at a junction of the lens and the wall wash housing. In another embodiment, the wall wash insert is configured to insert in a rectangular recessed luminaire unit.

20 Claims, 20 Drawing Sheets

(56) References Cited

U.S. PATENT DOCUMENTS

| | | | | |
|---|---|---|---|---|
| 2015/0241027 | A1 | 8/2015 | Zhang et al. | |
| 2015/0345742 | A1 | 12/2015 | Radl et al. | |
| 2017/0314750 | A1* | 11/2017 | Feldman | F21V 17/162 |
| 2020/0018452 | A1* | 1/2020 | Weyhaeghe | F21V 21/14 |

* cited by examiner

WALL WASH INSERT FOR RECESSED LIGHTING

FIELD OF THE INVENTIONS

This document relates to luminaires, and more specifically, to the field of the design of recessed lighting fixtures.

BACKGROUND

Recessed lighting fixtures are built into the ceiling of a building. Some recessed lighting fixtures are used to perform a wall wash. Wall washing is a lighting technique that brings walls to life by creating a smooth, uniform glow across their surface. Wall washing is used for the highlighting of architectural details, to create bold colors, or to create a sense of depth. Wall washing is a powerful tool for interior design. Wall washing is a lighting technique designed to spread light evenly across walls, enhancing their appearance and creating a polished, professional look. There is a need for easy installation and adjustment of wall wash features for recessed lighting unit design.

BRIEF SUMMARY

A solution that provides easy installation and adjustment to wall wash features in recessed lighting in described herein.

In one aspect, a wall wash insert includes a wall wash housing with a truncated conal shape, where the truncated conal shape is truncated at a top by a circular ridge and on a side and bottom by an elliptical opening, the elliptical opening extending from the circular ridge to the bottom of the truncated conal shape at an opposite side, the circular ridge includes a cylinder, open at each end, at the top of the wall wash housing, and a plurality of clips, a lens covering the elliptical opening, the lens including a lined diffusion pattern and a plurality of raised tabs located at a junction of the lens and the wall wash housing.

The wall wash insert may also include where the plurality of clips extend above the top of the circular ridge and extend outward in an L shape. The wall wash insert may also include where the wall wash housing is configured to insert inside of a recessed lighting luminaire. The wall wash insert may also include where the plurality of clips are configured to snap onto a reflector flange of the recessed lighting luminaire. The wall wash insert may also include where the plurality of clips are configured to slide around the reflector flange as the plurality of raised tabs are used to rotate the wall wash insert. The wall wash insert may also include where the lens is opaque. The wall wash insert may also include where the lens is clear. The wall wash insert may also include where the lens is semi-transparent.

In one aspect, a wall wash insert includes a wall wash housing with a prismatoid shape, where the prismatoid shape is truncated at the top by an octagonal ridge and on a side and bottom by a rectangular opening with two rounded sides, the two rounded sides being parallel, the rectangular opening extending from the octagonal ridge to the bottom of the prismatoid shape at an opposite side, the octagonal ridge includes an octagonal prism, open at each end, at the top of the wall wash housing, and a plurality of clips, a lens covering the rectangular opening, the lens including a lined diffusion pattern and a plurality of raised tabs located at a junction of the lens and the wall wash housing.

The wall wash insert may also include where the plurality of clips extend above the top of the octagonal ridge and extend outward in an L shape. The wall wash insert may also include where the wall wash housing is configured to insert inside of a recessed lighting luminaire. The wall wash insert may also include where the lens is opaque. The wall wash insert may also include where the lens is clear. The wall wash insert may also include where the lens is semi-transparent. The wall wash insert may also include where the plurality of clips are plastic. The wall wash insert may also include where the plurality of clips are metal. The wall wash insert may also include where the plurality of clips are configured to snap onto a reflector flange of the recessed lighting luminaire. The wall wash insert may also include where the plurality of clips are configured to slide around the reflector flange as the plurality of raised tabs are used to rotate the wall wash insert. The wall wash insert may also include where the wall wash insert may be positioned in any 90-degree rotation orientation in the recessed lighting luminaire. Other technical features may be readily apparent to one skilled in the art from the following figures, descriptions, and claims.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

In the following paragraphs, particular embodiments will be described in further detail by way of example with reference to the figures. In the description, well known components, methods, and/or processing techniques are omitted or briefly described. Dimensions used herein are used as an example, and could vary without deviating from the inventions described here. Furthermore, reference to various feature(s) of the embodiments is not to suggest that all embodiments must include the referenced feature(s).

Figure 1:
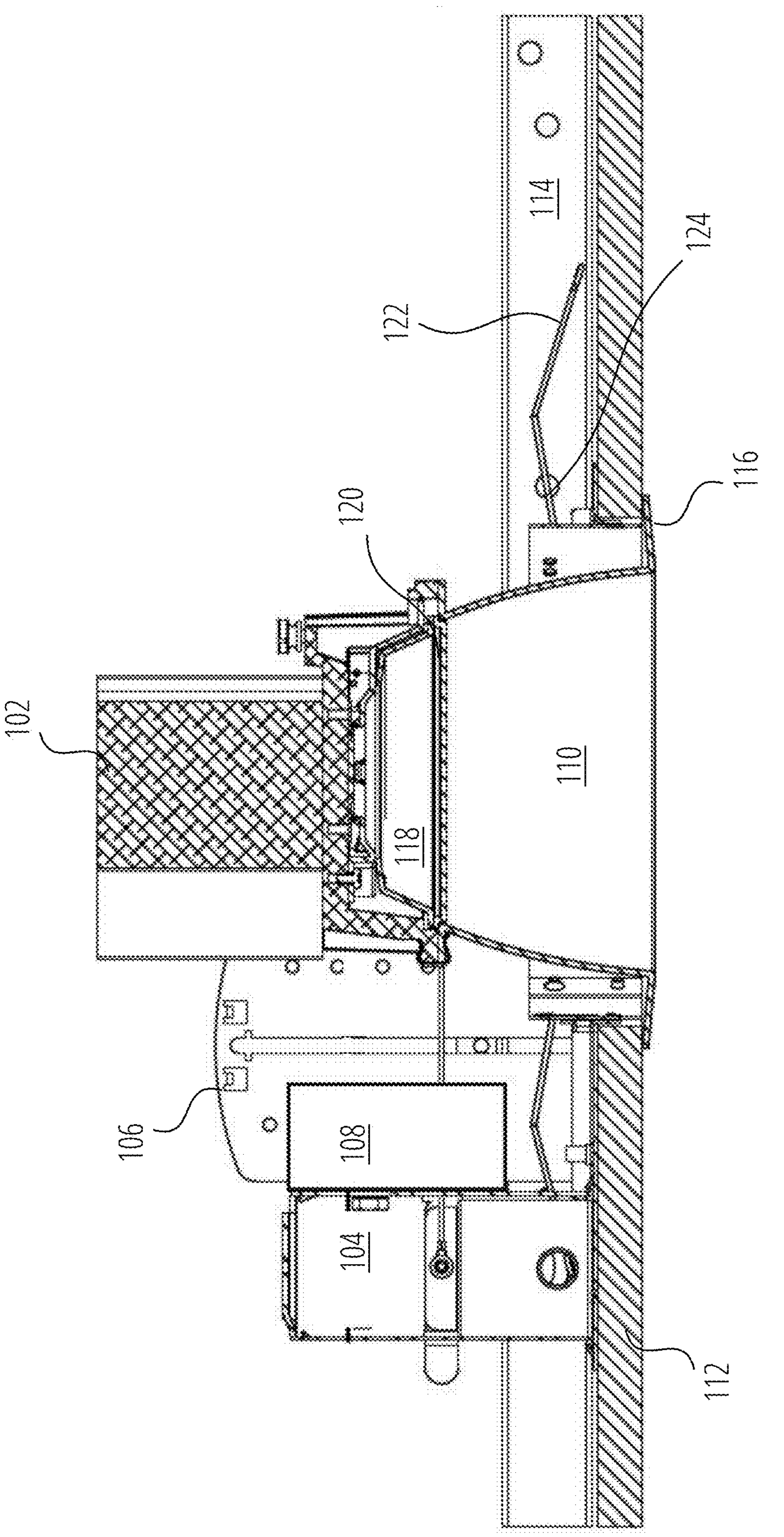
FIG. 1 shows a cross section of a recessed lighting luminaire mounted in a ceiling.

FIG. 1 shows a luminaire for mounting above a ceiling 112 as a recessed lighting unit. The LED module 102 may be mounted on the top of a reflector 110 and may provide the light for the room below the ceiling 112. The light from the LED module 102 may beam down through the upper reflector 118 and lens 120 into the reflector 110 where it could be directed into the room through the trim flange 116. The trim flange 116 could help support luminaire and direct the unit to a specific position. The trim flange 116 helps to prevent light from going into the ceiling 112. An electrical box 104 may connect to the building power and provide power to the control module 108 and to the LED module 102. In some embodiments, the electrical box 104 is 87 mm high. In some embodiments, the ceiling 112 is 13 mm in width. The LED module 102 could be 76 mm high and have a diameter of 82 mm.

The reflector 110 may be 114 mm at the bottom, 84 mm at the top, and 63 mm high. The reflector 110 may be a cone shape. In some embodiments, the reflector 110 is made of aluminum. In some embodiments, the reflector 110 may be made of four aluminum reflector panels. In some embodiments, the aluminum for the reflector 110 may be polished to present a reflective surface. In some embodiments, the aluminum for the reflector 110 may be painted. In some embodiments, the reflector 110 may be made of a non conductive material like plastic.

The luminaire assembly may be mounted on a mounting frame 114 that rests on the ceiling 112 and optionally may be connected to the building structure with hanger bar brackets 106. Mouse-trap supports 122 may be connected to the reflector 110 with mouse-trap springs 124 to hold the assembly tight to the ceiling 112. The mounting frame 114 is optional. In some embodiments, the luminaire may be directly installed into the cutout on the ceiling 112. Torsions spring supports 122 may be connected to the reflector 110 with torsion springs 124 to hold the assembly tight to the ceiling 112.

Figure 2:
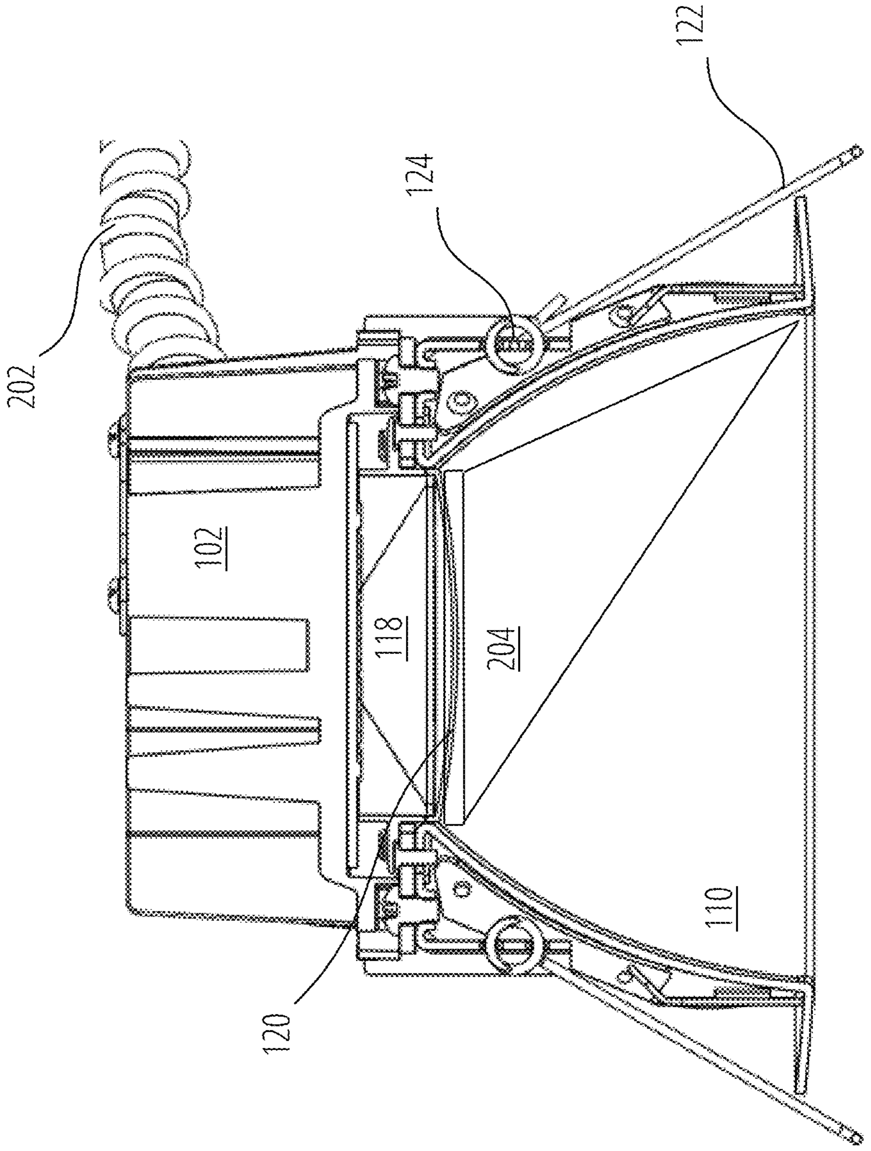
FIG. 2 illustrates recessed lighting unit can.

FIG. 2 is a focused view of the luminaire assembly. Power wires 202 could deliver power to the LED module 102. The LED module 102 focuses light into the upper reflector 118, through the lens 120, and into the wall wash insert 204 where the light is focused in a specific direction, most of the light proceeding through the reflector 110.

Figure 3:
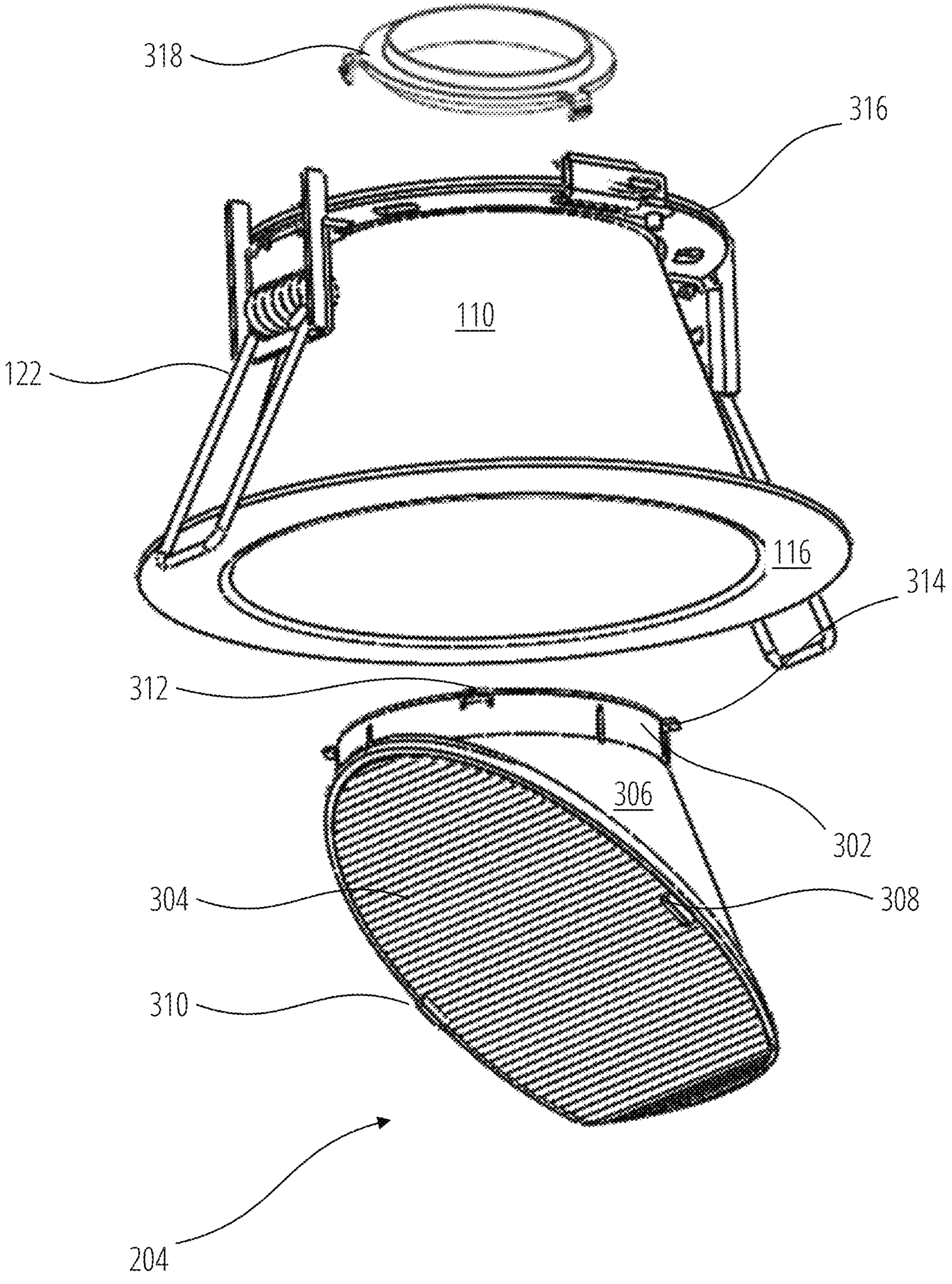
FIG. 3 illustrates an exploded view of the circular luminaire embodiment.

In FIG. 3 we see the wall wash insert 204 separate from the reflector 110. The reflector 110 has the trim flange 116 at the bottom and the mouse-trap supports 122 on the side, connected to the reflector flange 316. The reflector flange 316 may be a circular aluminum unit for connecting the reflector 110 and the mouse-trap support 122 to the LED module 102.

The wall wash insert 204 slides into the reflector 110 and may snap or twist into the reflector flange 316 with the clips 312, 314. In some embodiments, the clips 312, 314 are L shaped. The weight of the wall wash insert 204 is supported by the clips 312, 314. Because the clips 312, 314 rest on the reflector flange 316, the wall wash insert 204 may be free to rotate in a full circle within in the reflector 110. The knobs 308, 310 may facilitate a user's efforts to rotate the wall wash insert 204 to the desired position. In some embodiments, an upper optic ring 318 is placed above the reflector flange 316, and the clips 312, 314 may snap onto, and rotate around the upper optic ring 318. In some embodiments, the upper optic ring 318 is 94 mm in diameter with an 84 mm diameter opening in the middle.

The wall wash insert 204 may include a wall wash lens 304 that redirects the light in the desired direction. The wall wash lens 304 may be semi-transparent convex, concave, or flat material and could be translucent. The wall wash lens 304 may be made of polycarbonate or any other alternate plastic (e.g. ABS (acrylonitrile butadiene styrene), PS (polystyrene), PP (polypropylene), PE (polyethylene), PVC (polyvinyl chloride), PMMA (polymethyl methacrylate)). In some embodiments, the wall wash lens 304 could be glass. In some embodiments, the wall wash lens 304 may be clear. In other embodiments, the wall wash lens 304 has linear etchings to defuse the light (a lined diffusion pattern), which is sometimes called a linear spread lens. The linear spread could spread the light vertically and/or horizontally. In other embodiments, the wall wash lens 304 could use clear prismatic lens to increase the luminaire's beam spread. In another embodiment, the wall wash lens 304 could use a diffused lens to provide a soft focus, diffused lens for clean, even illumination. In still another embodiment, the wall wash lens 304 could use hex cell louvers to reduce glare. The wall wash lens 304 may be elliptical in shape. The wall wash lens 304 could have a height of 57 mm and a width at midpoint of 98 mm. In some embodiments, the bottom of the wall wash lens 304 turns a few millimeters from the bottom of the ellipse to form a flat surface parallel to the circular ridge 302.

The wall wash housing 306 could be opaque polycarbonate or any other alternate plastic (e.g. ABS (acrylonitrile butadiene styrene), PS (polystyrene), PP (polypropylene), PE (polyethylene), PVC (polyvinyl chloride), PMMA (polymethyl methacrylate)). The wall wash housing 306 may have a truncated conal shape, where the truncated conal shape is truncated at a top by a circular ridge 302 and on a side and bottom by an elliptical opening, the elliptical opening extending from the circular ridge 302 to the bottom of the truncated conal shape at an opposite side. The elliptical opening is configured to hold the wall wash lens 304. The wall wash lens 304 and the wall wash housing 306 may be attached by welding, ultrasonic welding, adhesives, or may connect with a snap mechanism, perhaps by using the knobs 308, 310. In other embodiments, the wall wash lens 304 and the wall wash housing 306 may be molded together in a one-step or a multi-step molding process. in some embodiments, the inside walls of the wall wash housing 306 could have transparent or semi-transparent, highly- or semi-specular finishes or painted finishes. The wall wash housing 306 could be 57 mm high and have an inside diameter of 84 mm at the top and 113 mm at the bottom, in some embodiments.

The wall wash housing 306 may have a circular ridge 302 at the top. The circular ridge 302 may be adhered to the wall wash housing 306 by welding, ultrasonic welding, adhesives, or may connect with a snap mechanism. The wall wash housing 306 and the circular ridge 302 may be molded together in a one-step or a multi-step molding process. The circular ridge 302 may be a cylinder, open at each end, at the top of the wall wash housing. The circular ridge 302 may be made of opaque polycarbonate or any other alternate plastic (e.g. ABS (acrylonitrile butadiene styrene), PS (polystyrene), PP (polypropylene), PE (polyethylene), PVC (polyvinyl chloride), PMMA (polymethyl methacrylate)). The inside wall of the circular ridge 302 could have transparent or semi-transparent, highly- or semi-specular finishes or painted finishes. The top of the circular ridge 302 may have clips 312, 314 attached or molded to the circular ridge 302.

Figure 4:
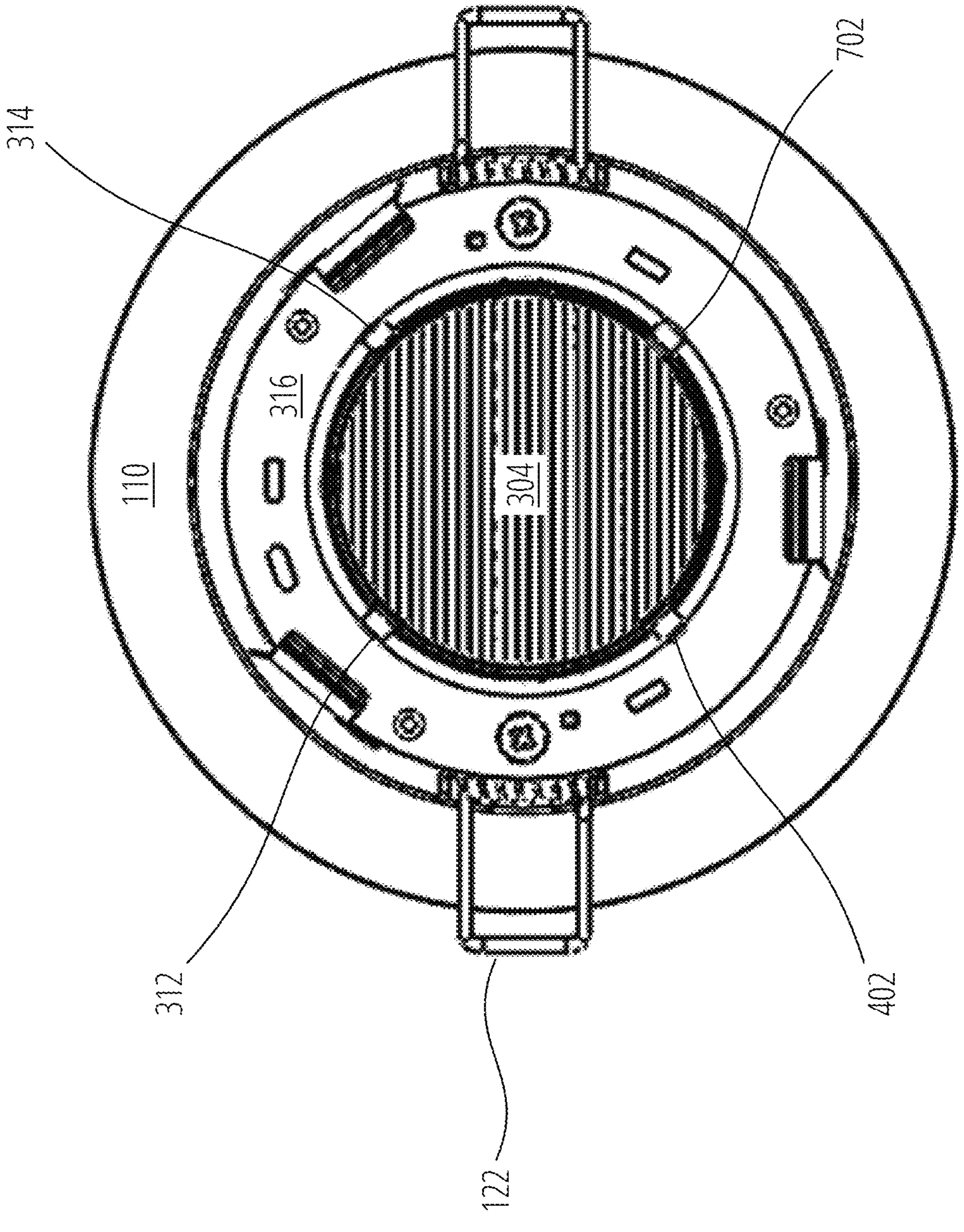
FIG. 4 illustrates the top view of the circular luminaire embodiment.

FIG. 4 shows the top of the luminaire, looking down into the wall wash insert 204. The wall wash lens 304 can be seen through the hole in the reflector flange 316. This hole is where the LED module 102 shines the light. The reflector 110 can be seen on the sides around the reflector flange 316. Three clip 312, 314, 402 may hold the wall wash insert 204 to the reflector flange 316.

Figure 5:
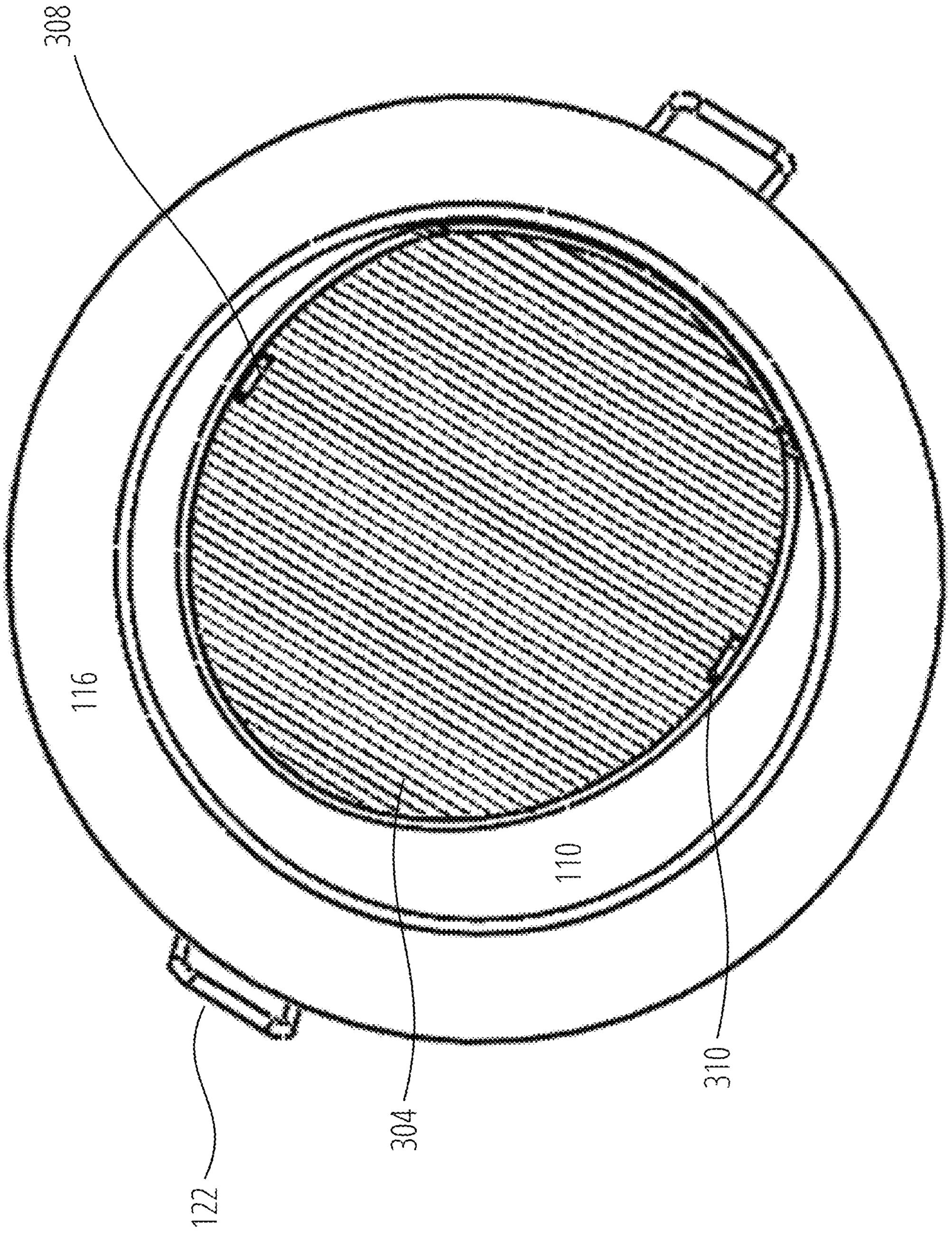
FIG. 5 illustrates the bottom view of the circular luminaire embodiment.

The view of the wall wash insert 204 in FIG. 5 is from the bottom. The wall wash lens 304 is visible in the center of this view, with the two knobs 308, 310 on the top right and lower left. The reflector 110 is on the side, surrounding most of the wall wash lens 304. The reflector 110 is encircled by the trim flange 116 in this embodiment. The mouse-trap supports 122 are visible from behind the trim flange 116.

Figure 6:
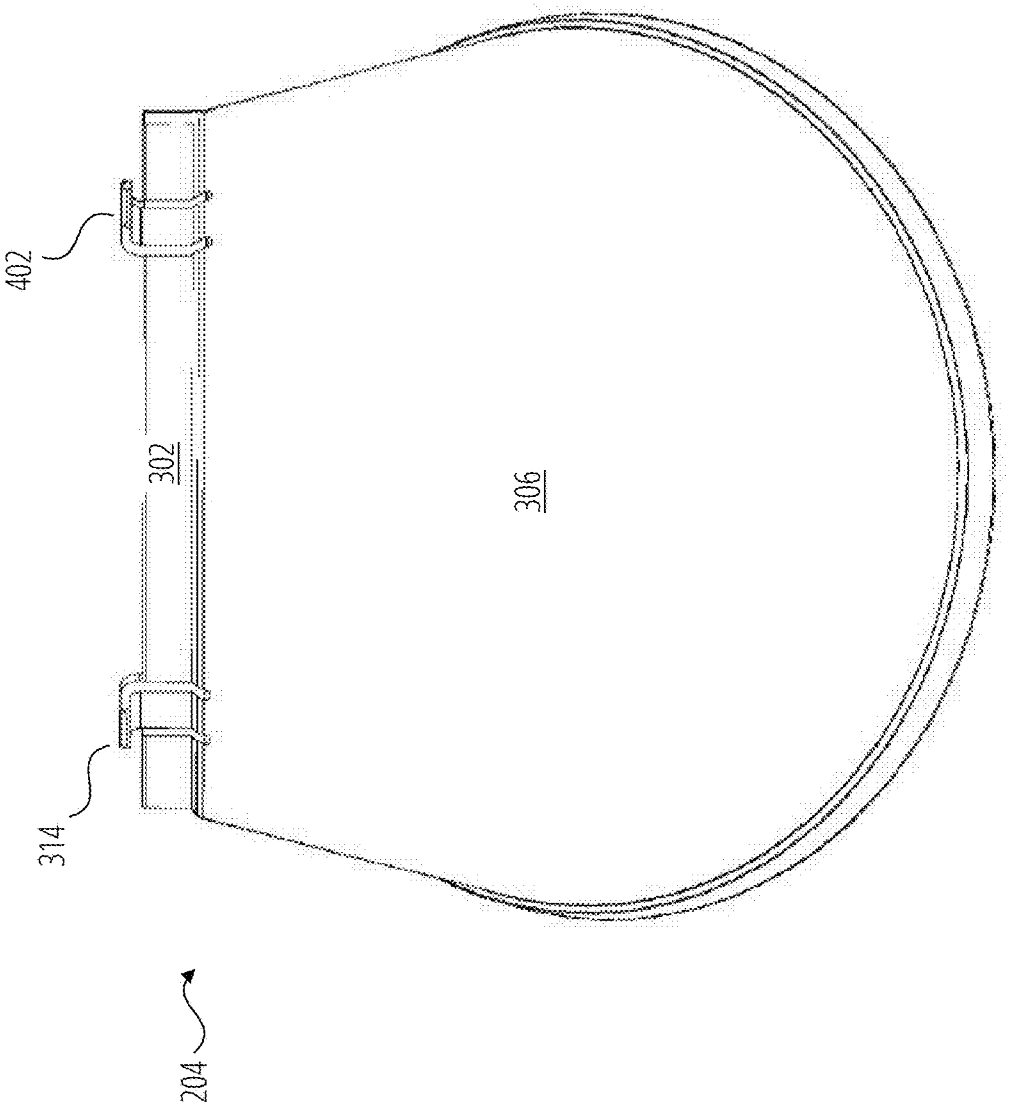
FIG. 6 illustrates the front view of the elliptical wall wash insert embodiment.

FIG. 6 is a front view of the wall wash insert 204. From the front side, the wall wash housing 306 is visible along with the front side of the circular ridge 302. The circular ridge 302 is seen with two clips 314, 402. The clips 314, 402 could be wire or metal clips inserted into holes near the interface between the wall wash housing 306 and the circular ridge 302. In other embodiments, the clips 314, 402 could be made of polycarbonate material (or other plastic) and could be molded into the circular ridge 302.

Figure 7:
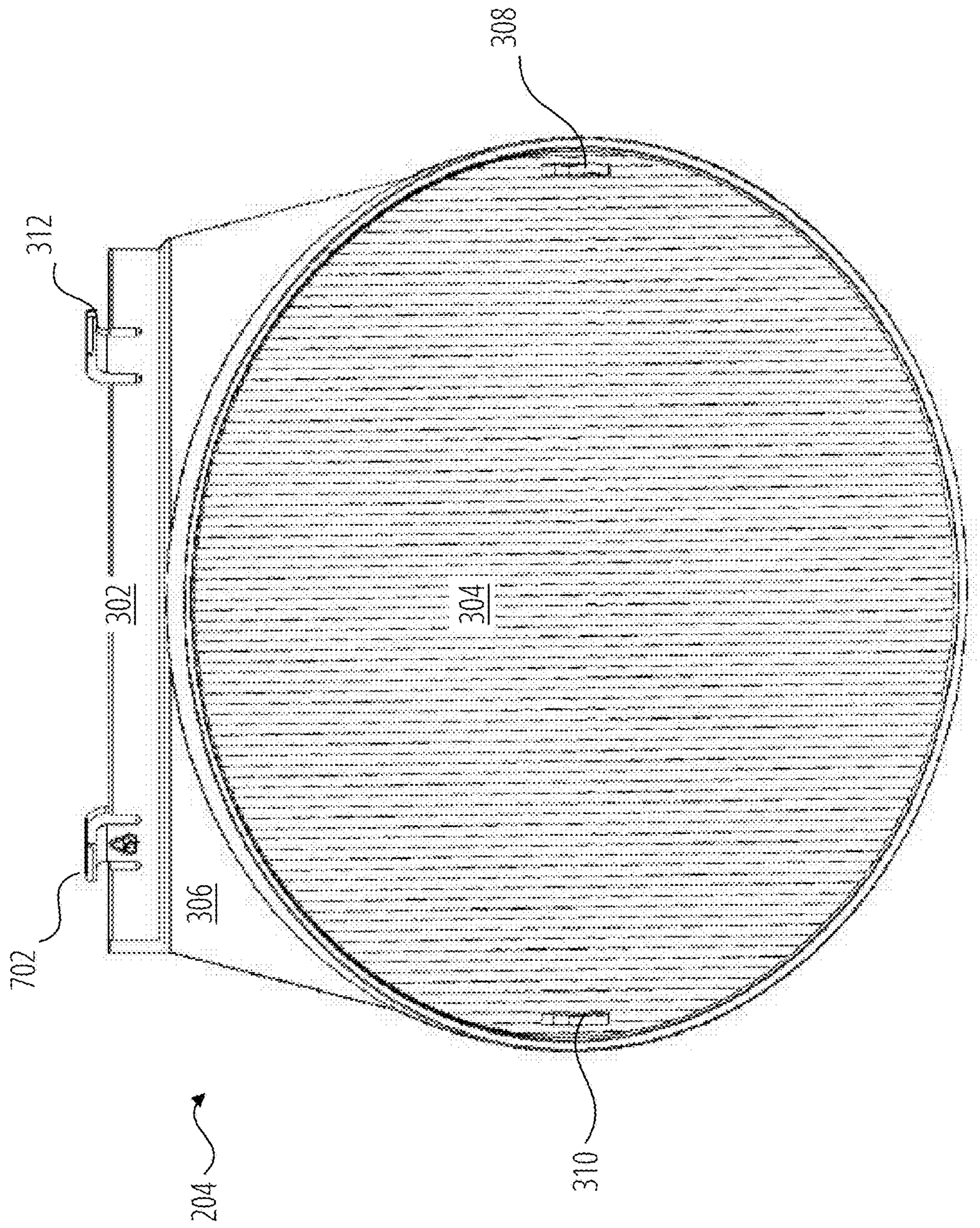
FIG. 7 illustrates the back view of the elliptical wall wash insert embodiment.

FIG. 7 is a back view of the wall wash insert 204. The wall wash lens 304 covers most of this view. The two knobs 308, 310 are on each side of the wall wash lens 304 to facilitate the rotation of the wall wash insert 204 within the reflector 110. A small portion of the wall wash housing 306 is visible above the wall wash lens 304. The circular ridge 302 with its clips 312, 702 is attached to the top of the wall wash housing 306.

Figure 8:
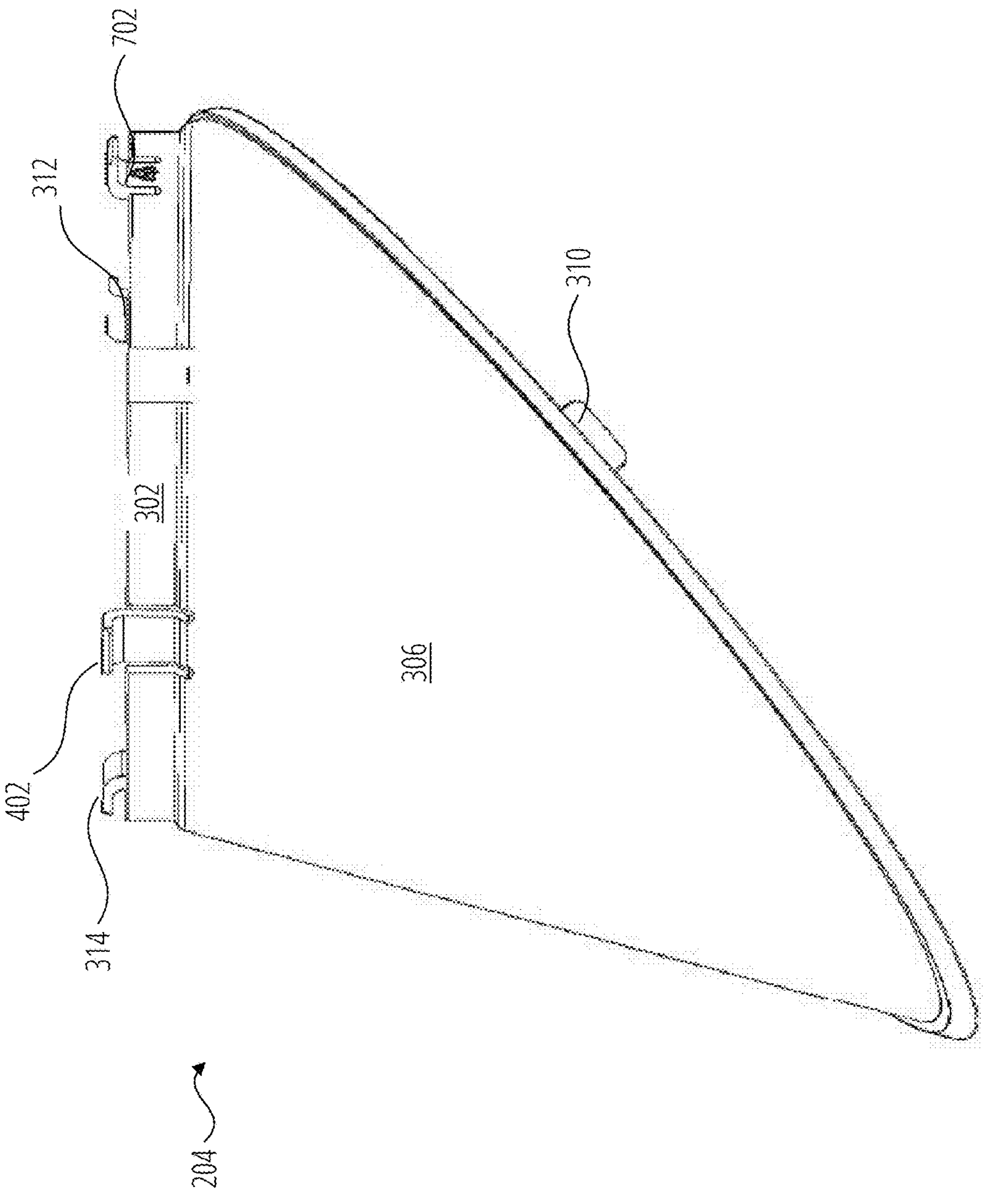
FIG. 8 illustrates the right view of the elliptical wall wash insert embodiment.
Figure 9:
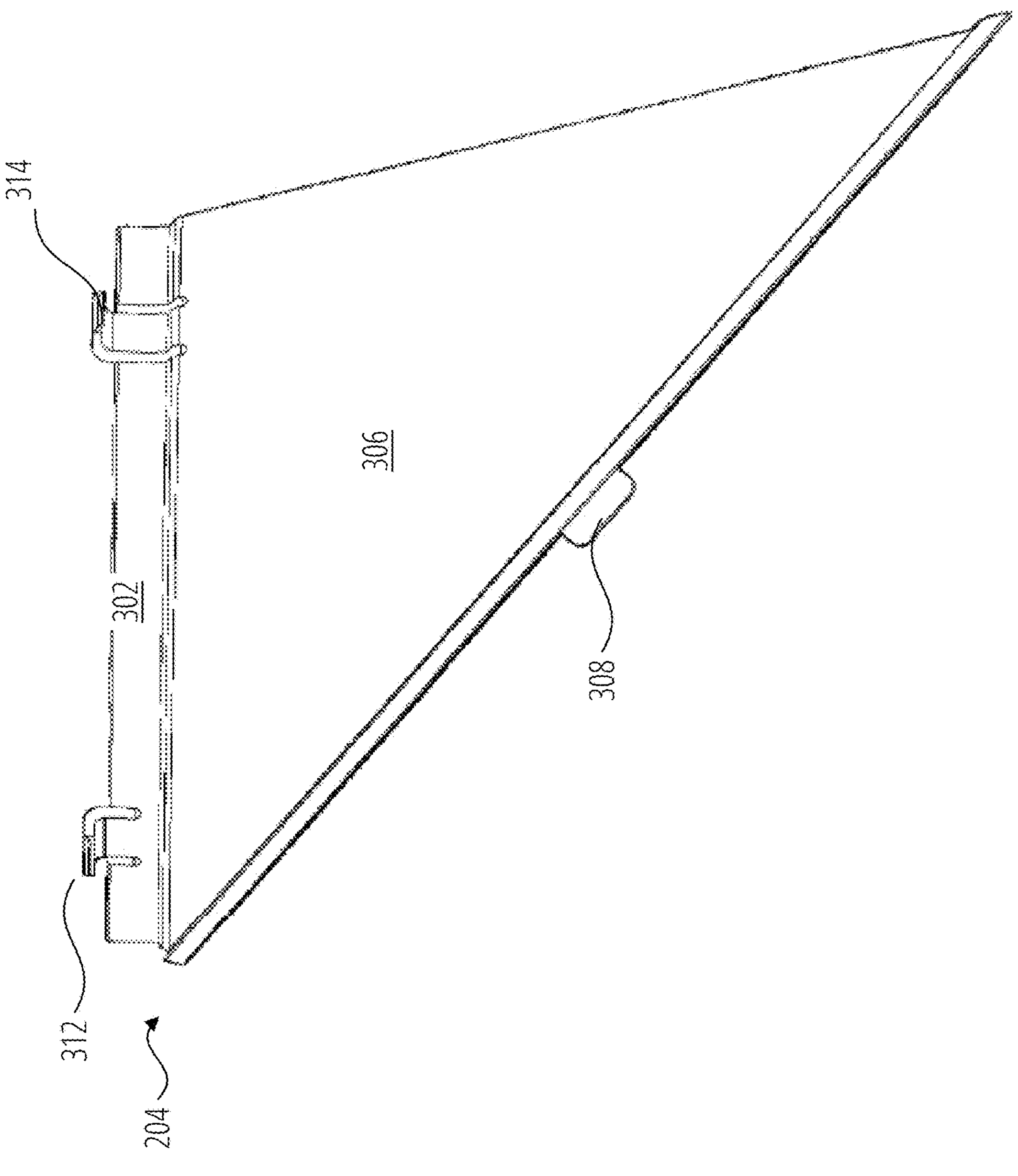
FIG. 9 illustrates the left view of the elliptical wall wash insert embodiment.

FIG. 8 and FIG. 9 are left and right side views of the wall wash insert 204. All four clips 312, 314, 402, 702 are visible in the FIG. 8 view, each attached to the circular ridge 302. Other embodiments may have a different number of clips. The circular ridge 302 is attached above the wall wash housing 306. The knobs 308, 310 are visible from a side profile in these figures.

Figure 10:
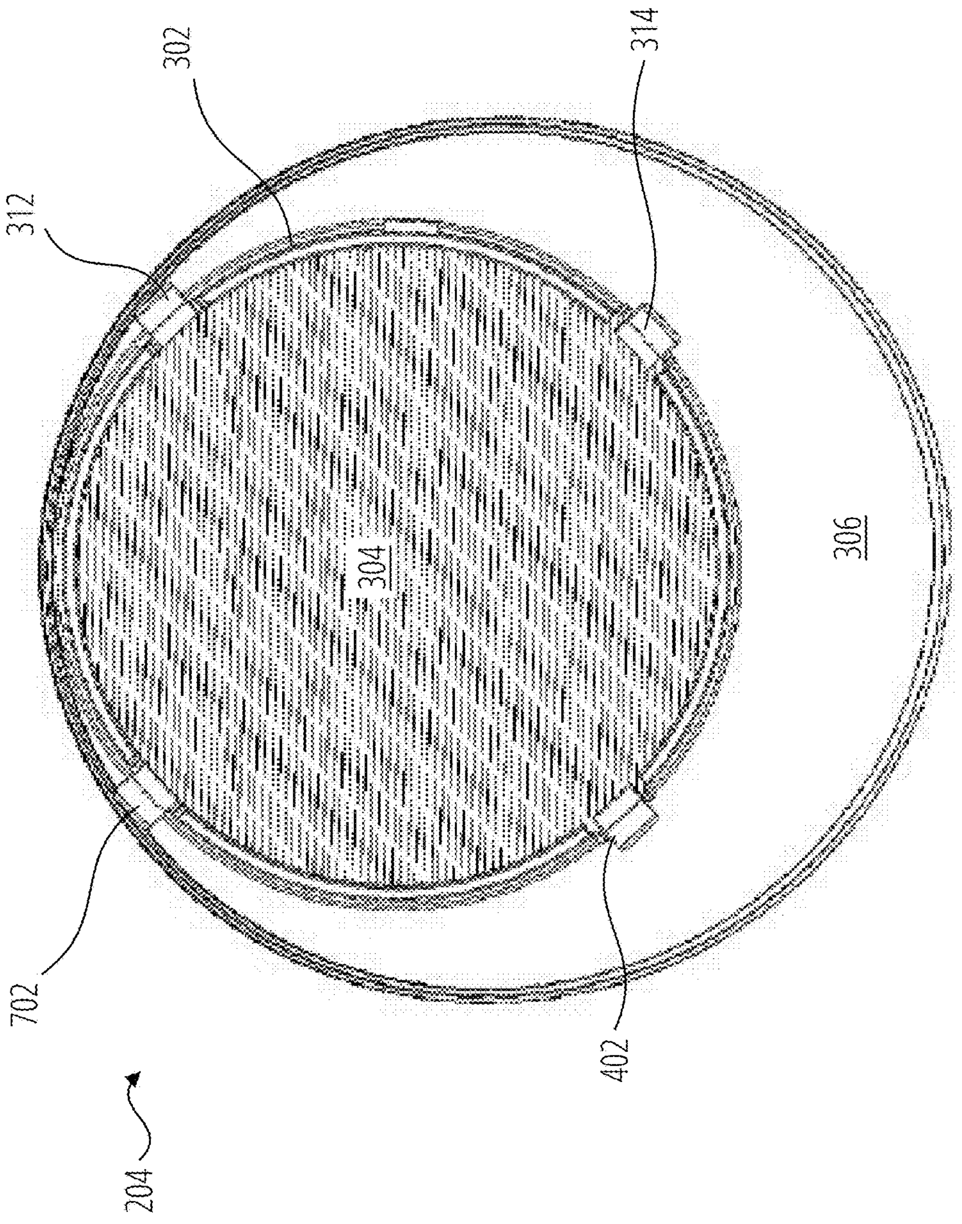
FIG. 10 illustrates the top view of the elliptical wall wash insert embodiment.

FIG. 10 shows a top view of the wall wash insert 204. The wall wash lens 304 can be seen as viewed through the circular ridge 302 and the wall wash housing 306. The circular ridge 302 in this embodiment has four clips 312, 314, 402, 702, each attached to the circular ridge 302.

Figure 11:
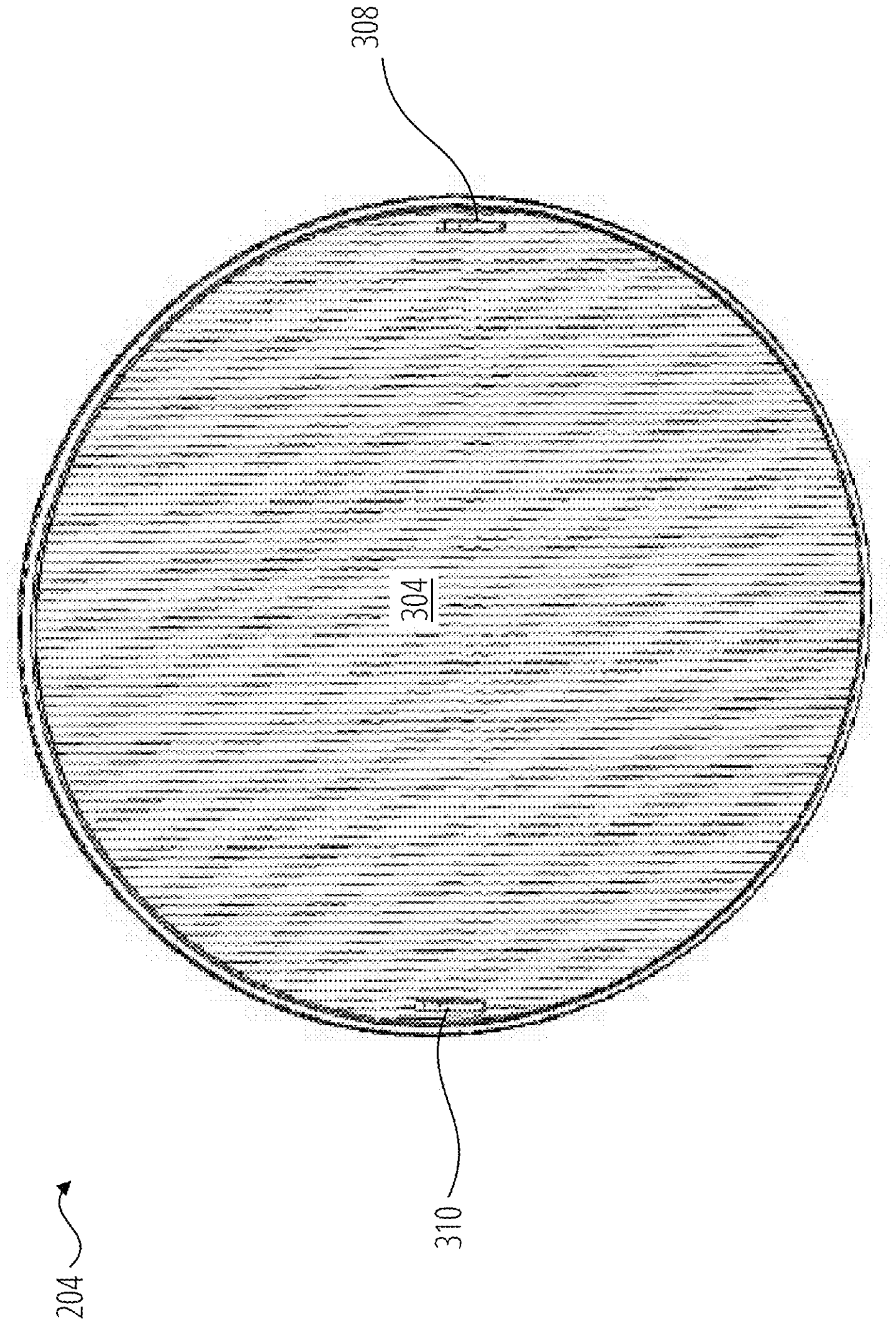
FIG. 11 illustrates the bottom view of the elliptical wall wash insert embodiment.

When the wall wash insert 204 is viewed from the bottom, as in FIG. 11, only the wall wash lens 304 is visible, along with the two knobs 308, 310. The knobs 308, 310 could be adhered to the wall wash lens 304 with an adhesive, welded together, mechanically attached with a rivet, screw, or snap fitting, or the knobs 308, 310 could be molded with the wall wash lens 304. In other embodiments, the knobs 308, 310 are adhered to the wall wash housing 306 with an adhesive, welded together, mechanically attached with a rivet, screw, or snap fitting, or molded together. The knobs 308, 310 could be polycarbonate or any other alternate plastic (e.g. ABS (acrylonitrile butadiene styrene), PS (polystyrene), PP (polypropylene), PE (polyethylene), PVC (polyvinyl chloride), PMMA (polymethyl methacrylate)).

FIG. 12 through FIG. 20 shows a rectangular luminaire for mounting above a ceiling 112 as a recessed lighting unit. This embodiment may have a rectangular reflector 1202 and a rectangular wall wash insert 1208.

Figure 12:
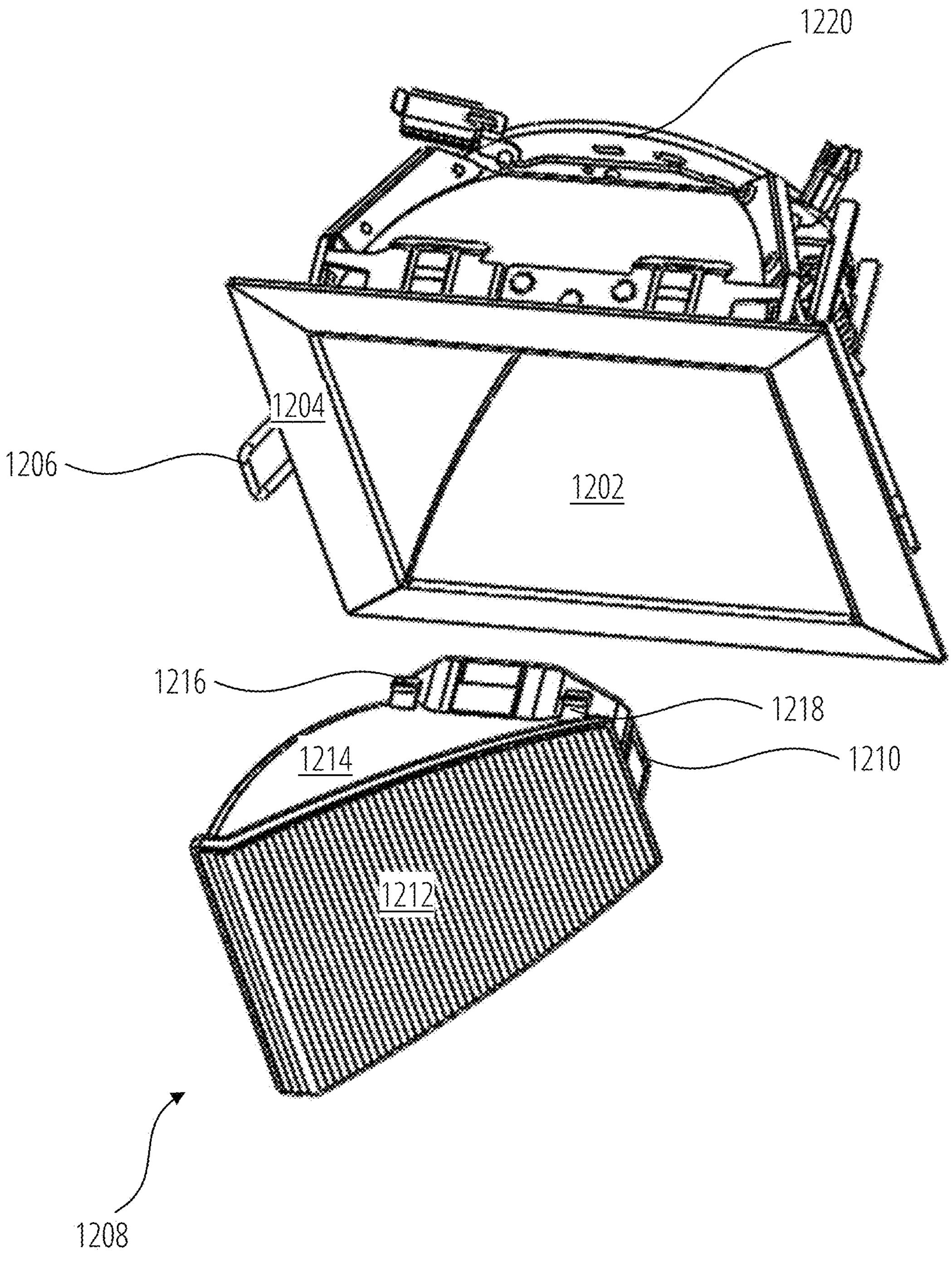
FIG. 12 illustrates an exploded view of the rectangular luminaire embodiment.

In FIG. 12 we see the wall wash insert 1208 separate from the reflector 1202. The reflector 1202 has the rectangular trim flange 1204 at the bottom and the mouse-trap supports 1206 on the side, connected to the reflector flange 1220. The reflector flange 1220 may be a circular aluminum unit with a rectangular opening for connecting the reflector 1202 and the mouse-trap support 1206 to the LED module 102.

The wall wash insert 1208 slides into the reflector 1202 and may snap or twist into the reflector flange 1220 with the clips 1216, 1218. FIG. 12 shows two clips, but other embodiments may have any number of clips. The weight of the wall wash insert 1208 is supported by the clips 1216, 1218. Because the clips 1216, 1218 rest on the reflector flange 1220, the wall wash insert 1208 may snap into the reflector 1202. In some embodiments, an upper optic ring 318 is placed above the reflector flange 1220, and the clips 1216, 1218 may snap onto the upper optic ring 318. In some embodiments, the upper optic ring 318 is 94 mm in diameter with an 84 mm diameter (or square with a smaller dimension) opening in the middle.

The wall wash insert 1208 may include a wall wash lens 1212 that redirects the light in the desired direction. The wall wash lens 1212 may be semi-transparent convex, concave, or flat material and could be translucent. The wall wash lens 1212 may be made of polycarbonate or any other alternate plastic (e.g. ABS (acrylonitrile butadiene styrene), PS (polystyrene), PP (polypropylene), PE (polyethylene), PVC (polyvinyl chloride), PMMA (polymethyl methacrylate)). In some embodiments, the wall wash lens 1212 could be glass. In some embodiments, the wall wash lens 1212 may be clear. In other embodiments, the wall wash lens 1212 has linear etchings to defuse the light, which is sometimes called a linear spread lens. The linear spread could spread the light vertically and/or horizontally. In other embodiments, the wall wash lens 1212 could use clear prismatic lens to increase the luminaire's beam spread. In another embodiment, the wall wash lens 1212 could use a diffused lens to provide a soft focus, diffused lens for clean, even illumination. In still another embodiment, the wall wash lens 1212 could use hex cell louvers to reduce glare. The wall wash lens 1212 may be substantially parallelogram in shape, with a wider bottom and a narrower top. In some embodiments, the side walls of the wall wash lens 1212 may be bowed. The wall wash lens 1212 could have a height of 57 mm and a width of 84 mm at the top and 113 mm at the bottom. In some embodiments, the bottom of the wall wash lens 1212 turns a few millimeters from the bottom of the ellipse to form a flat surface parallel to the octagonal ridge 1210.

The wall wash housing 1214 could be opaque polycarbonate or any other alternate plastic (e.g. ABS (acrylonitrile butadiene styrene), PS (polystyrene), PP (polypropylene), PE (polyethylene), PVC (polyvinyl chloride), PMMA (polymethyl methacrylate)). The wall wash housing 1214 may have a truncated parallelogram box shape, such as a prismatoid shape, where the truncated parallelogram box shape has a flat open top that connects to the octagonal ridge 1210 and on a side and bottom by a parallelogram opening, the parallelogram opening extending from the octagonal ridge 1210 to the bottom of the truncated box shape at an opposite side. The parallelogram opening is configured to hold the wall wash lens 1212. The back wall of the wall wash housing 1214 is substantially a parallelogram. In some embodiments, the sides of the back wall are bowed. In some embodiments, the three walls of the wall wash housing 1214 are separate pieces. These three walls could be adhered together by welding, ultrasonic welding, adhesives, may connect with a snap mechanism, or may simply lean against each other. In other embodiments, the three walls of the wall wash housing 1214 may be molded into a single unit. The wall wash lens 1212 and the wall wash housing 1214 may be attached by welding, ultrasonic welding, adhesives, or may connect with a snap mechanism. In other embodiments, the wall wash lens 1212 and the wall wash housing 1214 may be molded together in a one-step or a multi-step molding process. In some embodiments, the inside walls of the wall wash housing 1214 could have transparent or semi-transparent, highly- or semi-specular finishes or painted finishes. The wall wash housing 1214 could be 57 mm high and have an inside diameter of 84 mm at the top and 113 mm at the bottom, in some embodiments.

The wall wash housing 1214 may have a substantially octagonal ridge 1210 at the top. The octagonal ridge 1210 may be adhered to the wall wash housing 1214 by welding, ultrasonic welding, adhesives, or may connect with a snap mechanism. The wall wash housing 1214 and the octagonal ridge 1210 may be molded together in a one-step or a multi-step molding process. The octagonal ridge 1210 may be a box, open at each end, at the top of the wall wash housing 1214. The octagonal ridge 1210 may be made of opaque polycarbonate or any other alternate plastic (e.g. ABS (acrylonitrile butadiene styrene), PS (polystyrene), PP (polypropylene), PE (polyethylene), PVC (polyvinyl chloride), PMMA (polymethyl methacrylate)). The inside wall of the octagonal ridge 1210 could have transparent or semi-transparent, highly- or semi-specular finishes or painted finishes. The top of the octagonal ridge 1210 may have clips 312, 314 attached or molded to the circular ridge 302. In some embodiments, the four walls of the octagonal ridge 1210 could be separate pieces adhered together.

Figure 13:
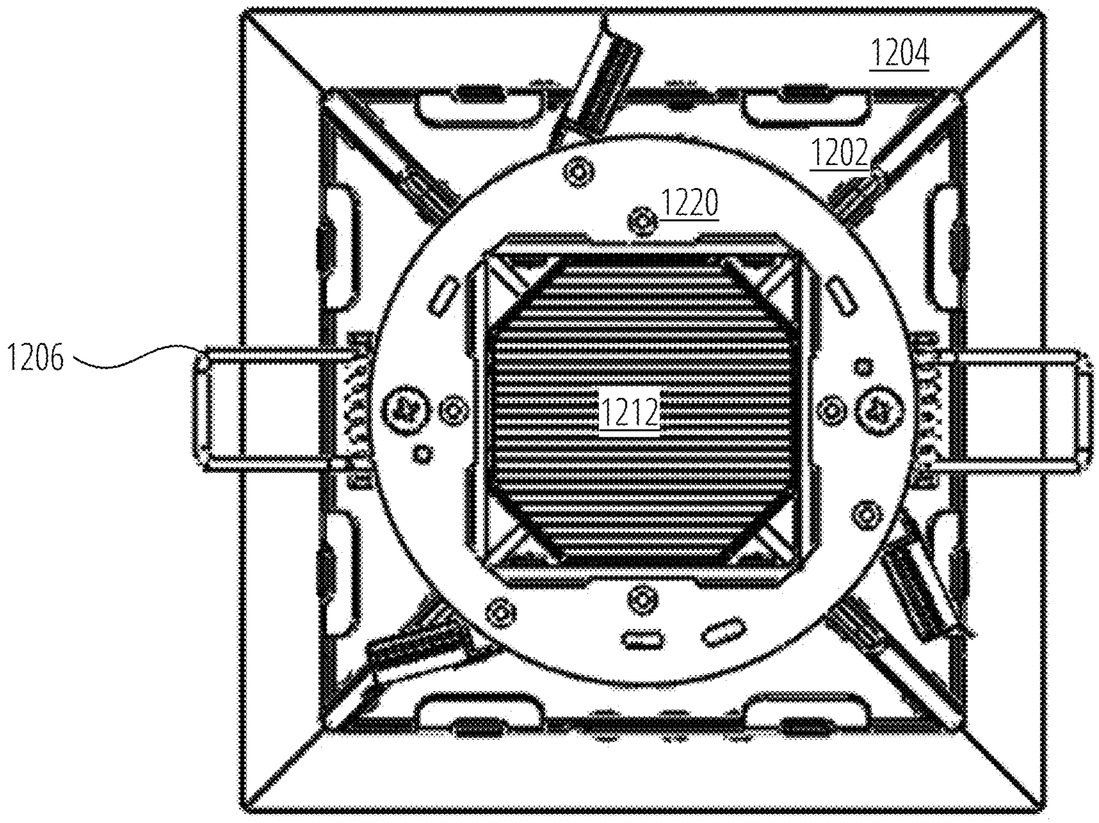
FIG. 13 illustrates the top view of the rectangular luminaire embodiment.

FIG. 13 is a top view of the luminaire. The wall wash lens 1212 can be seen as viewed through the reflector flange 1220 and the reflector 1202. The reflector flange 1220 is circular with a hexagonal opening. This hexagonal opening is there the light from the LED module 102 is directed. The trim flange 1204 is visible at the bottom of the assembly, as are the mouse-trap supports 1206.

Figure 14:
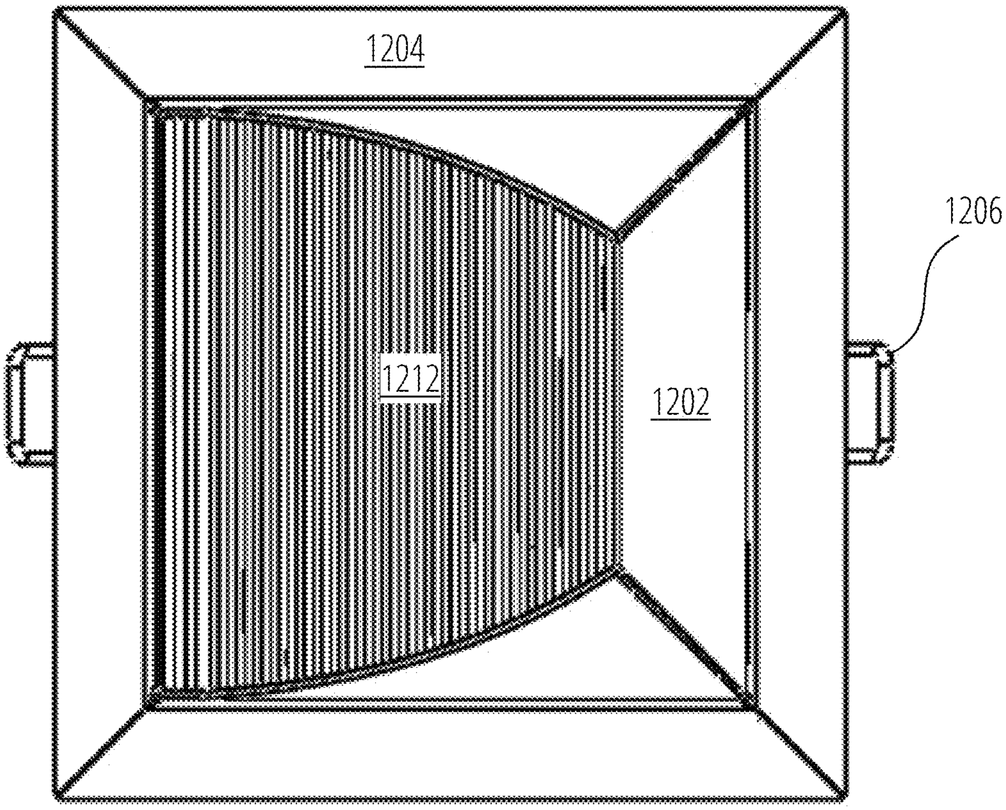
FIG. 14 illustrates the bottom view of the rectangular luminaire embodiment.

FIG. 14 is a bottom view of the luminaire. The trim flange 1204 surrounds the reflector 1202. The mouse-trap supports 1206 are visible on the left and right sides. The wall wash lens 1212 is seen connected to the three walls of the reflector 1202.

Figure 15:
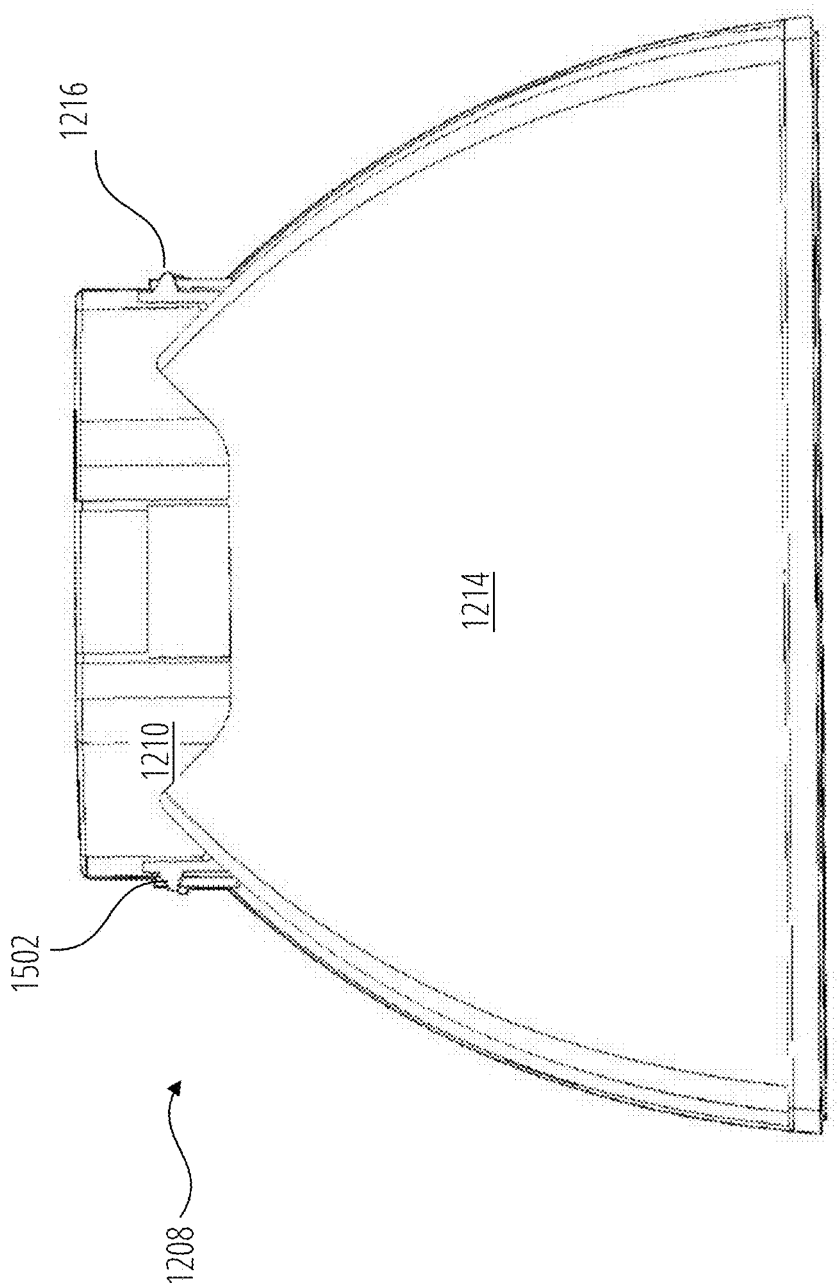
FIG. 15 illustrates the front view of the rectangular wall wash insert embodiment.

FIG. 15 is a front view of the wall wash insert 1208. From the front side, the wall wash housing 1214 is visible along with the front side of the octagonal ridge 1210. The octagonal ridge 1210 is seen with two clips 1502, 1216. The clips 1502, 1216 could be wire or metal clips inserted into holes near the interface between the wall wash housing 1214 and the octagonal ridge 1210. In other embodiments, the clips 1502, 1216 could be made of polycarbonate material (or other plastic) and could be molded into the octagonal ridge 1210.

Figure 16:
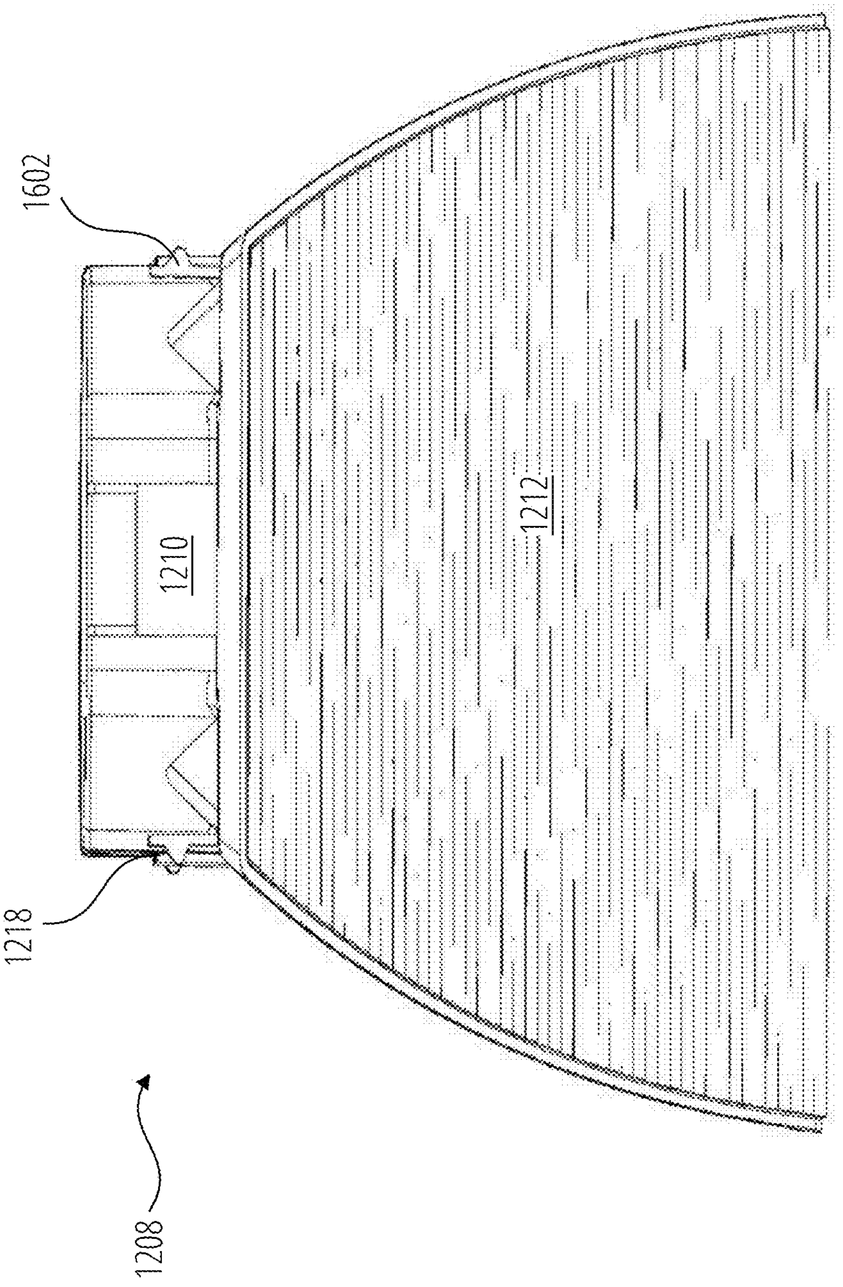
FIG. 16 illustrates the back view of the rectangular wall wash insert embodiment.

FIG. 16 is a back view of the wall wash insert 1208. The wall wash lens 1212 covers most of this view. The octagonal ridge 1210 with its clips 1218, clip 1602 is attached to the top of the wall wash lens 1212 and the wall wash housing 1214.

Figure 17:
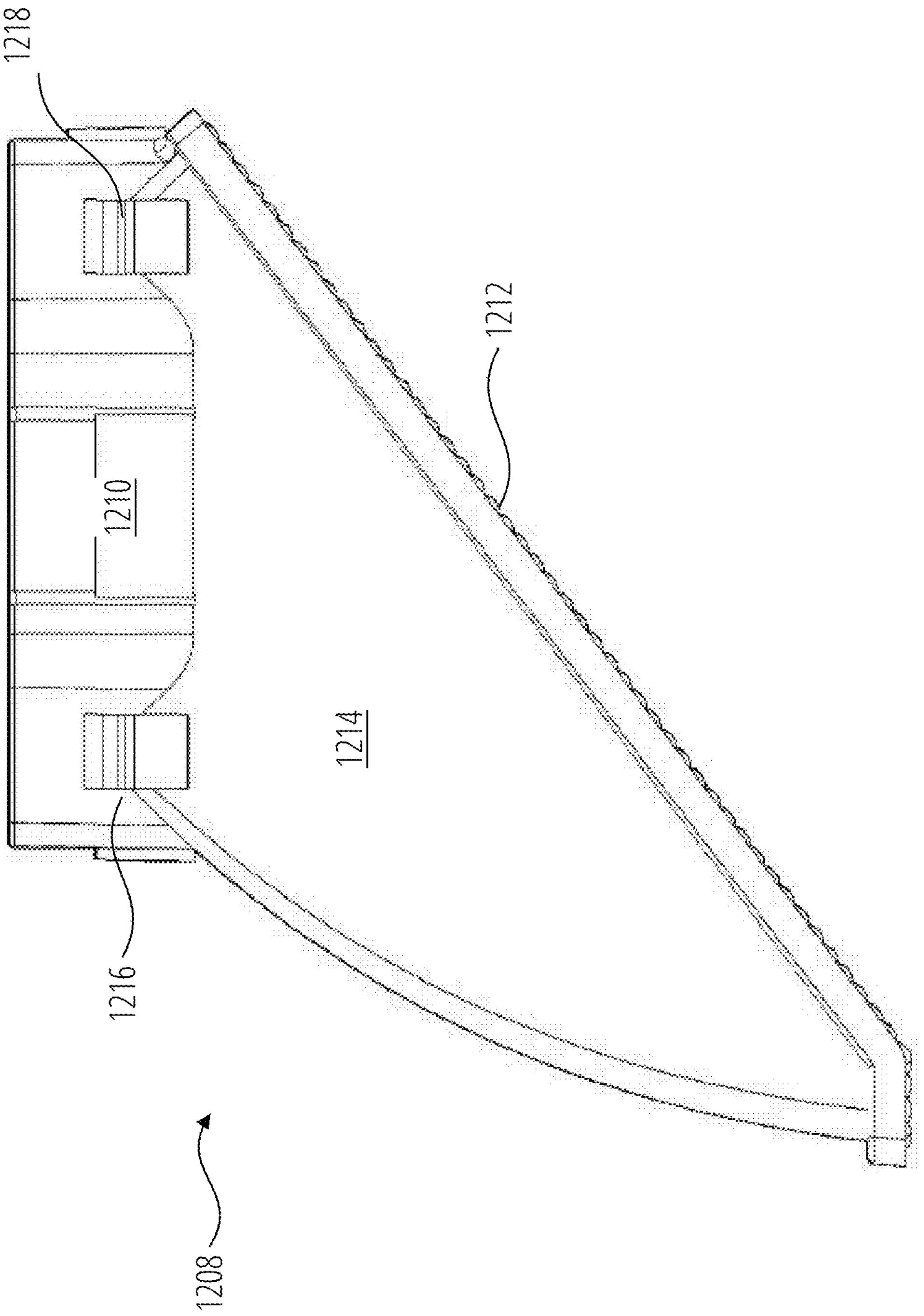
FIG. 17 illustrates the right view of the rectangular wall wash insert embodiment.

FIG. 17 is the right-side view of the wall wash insert 1208. Two of the four clips 1216, 1218 are visible in the FIG. 17 view, each attached to the octagonal ridge 1210. Other embodiments may have a different number of clips. The octagonal ridge 1210 is attached above the wall wash housing 1214, and the wall wash lens 1212 can be seen on the right-lower side of the wall wash housing 1214.

Figure 18:
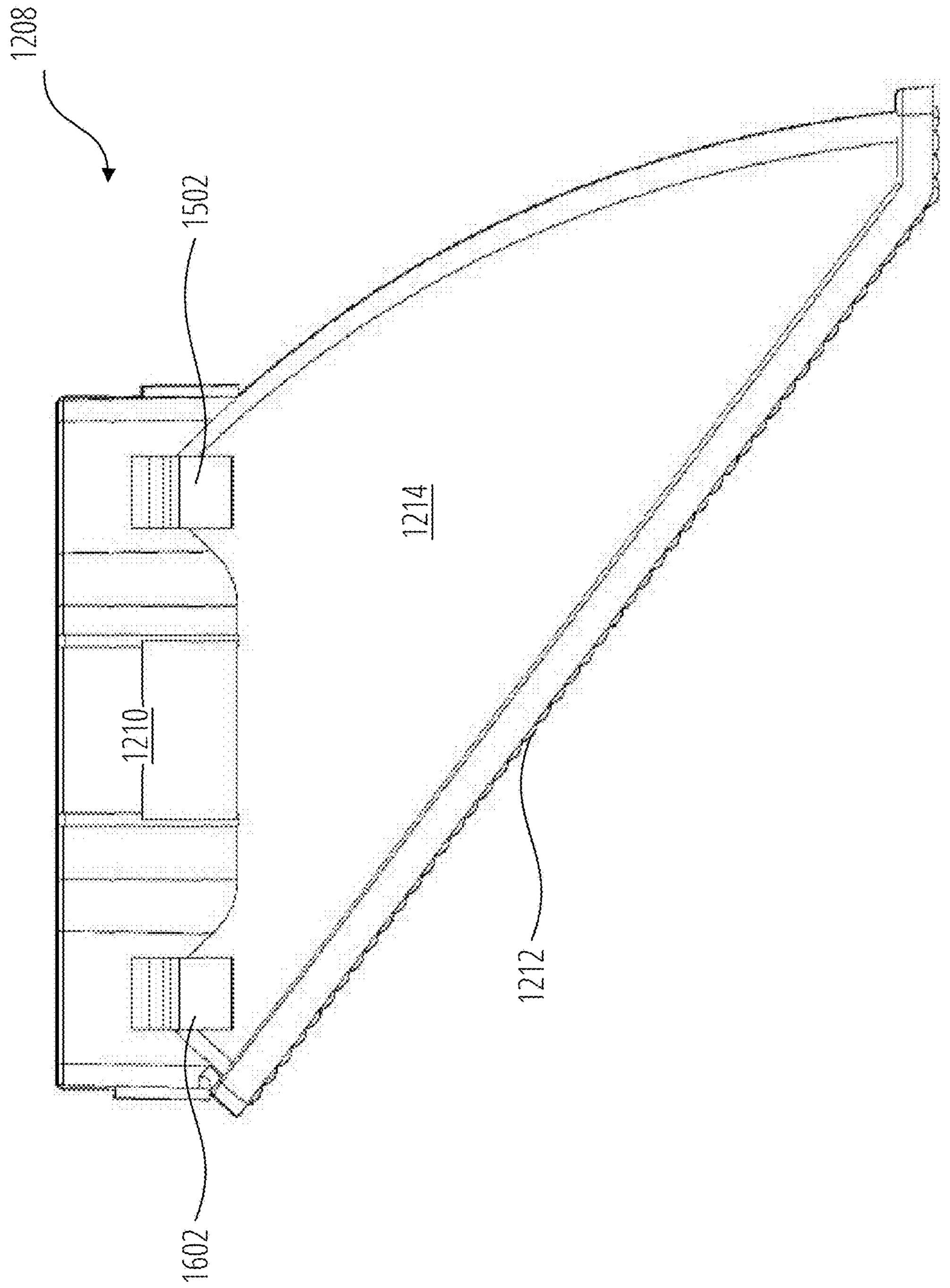
FIG. 18 illustrates the left view of the rectangular wall wash insert embodiment.

FIG. 18 is the left-side view of the wall wash insert 1208. Two of the four clips 1602, 1502 are visible in the FIG. 18 view, each attached to the octagonal ridge 1210. Other embodiments may have a different number of clips. The octagonal ridge 1210 is attached above the wall wash housing 1214, and the wall wash lens 1212 can be seen on the left-lower side of the wall wash housing 1214.

Figure 19:
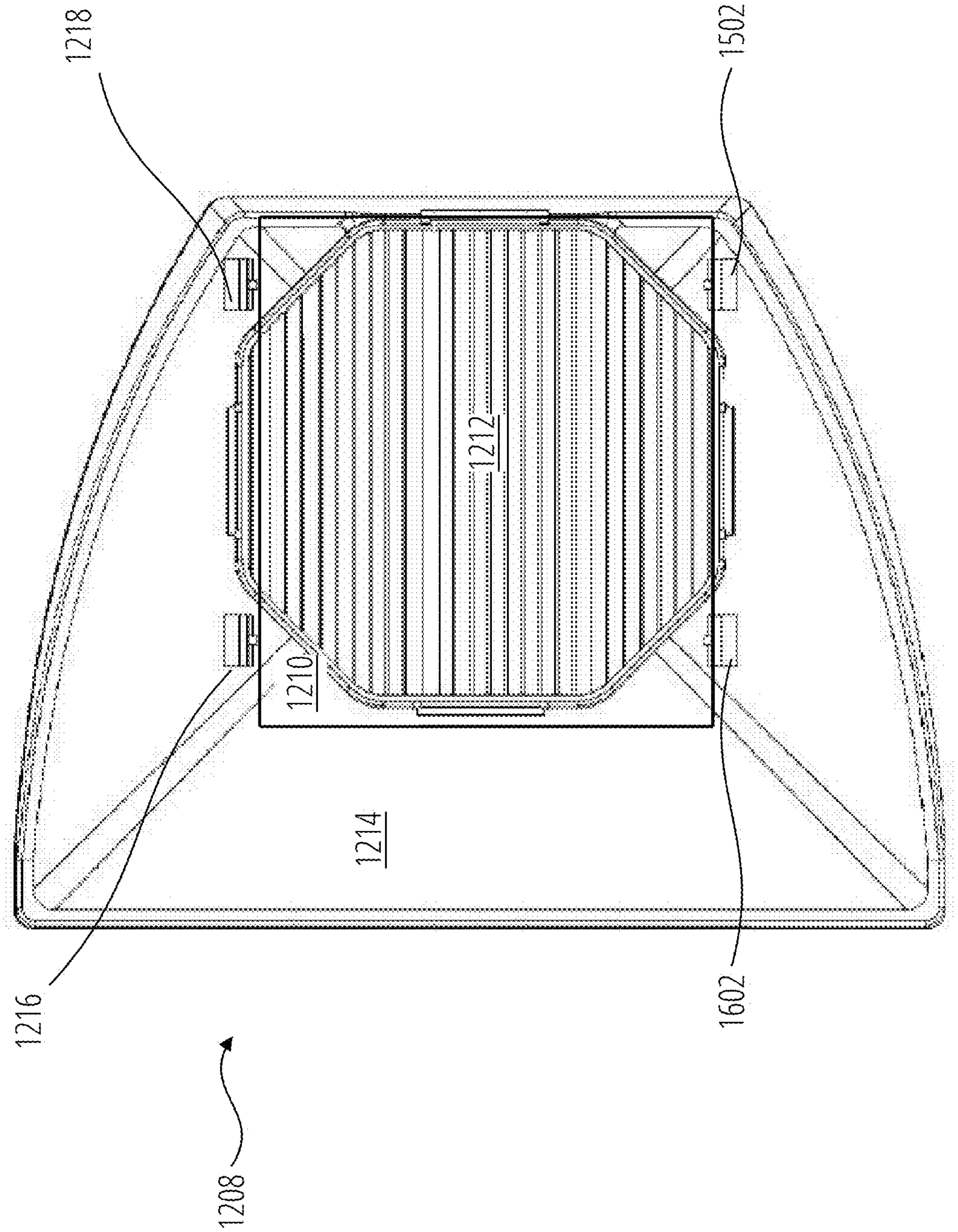
FIG. 19 illustrates the top view of the rectangular wall wash insert embodiment.

FIG. 19 shows a top view of the wall wash insert 1208. The wall wash lens 1212 can be seen as viewed through the octagonal ridge 1210 and the wall wash housing 1214. The octagonal ridge 1210 in this embodiment has four clips 1216, 1218, 1502, 1602, each attached to the octagonal ridge 1210.

Figure 20:
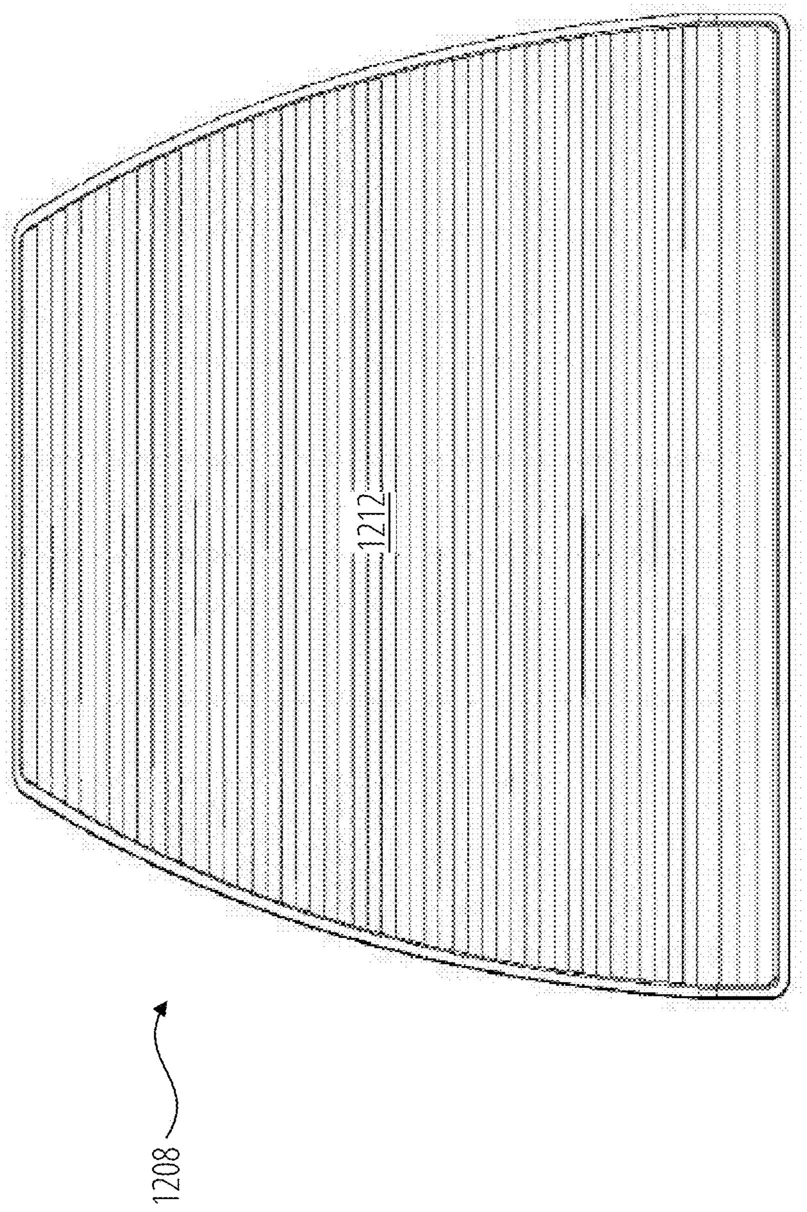
FIG. 20 illustrates the bottom view of the rectangular wall wash insert embodiment.

When the wall wash insert 1208 is viewed from the bottom, as in FIG. 20, only the wall wash lens 1212 is visible. The two parallel edges, one at the top and one at the bottom are shown, along with the bowed-out edges for the two side edges.

While the disclosure has been illustrated and described in detail in the drawings and foregoing description, such illustration and description are to be considered illustrative or exemplary and not restrictive. The claimed inventions are not limited to the disclosed embodiments.

The term "substantially equal" may be used to refer to values that are within ±20% of one another in some embodiments, within ±10% of one another in some embodiments, within ±5% of one another in some embodiments, and yet within ±2% of one another in some embodiments.

Other variations to the disclosed embodiments can be understood and effected by those skilled in the art of practicing the claimed inventions, from a study of the drawings, the disclosure, and the appended claims.

In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to obtain an advantage.

Any reference signs in the claims should not be construed as limiting the scope.

LISTING OF DRAWING ELEMENTS

102 LED module
104 electrical box
106 hanger bar bracket
108 control module
110 reflector
112 ceiling
114 mounting frame
116 trim flange
118 upper reflector
120 lens
122 mouse-trap support
124 mouse-trap spring
202 power wire
204 wall wash insert
302 circular ridge
304 wall wash lens
306 wall wash housing
308 knob
310 knob
312 clip

314 clip
316 reflector flange
318 upper optic ring
402 clip
702 clip
1202 reflector
1204 trim flange
1206 mouse-trap support
1208 wall wash insert
1210 octagonal ridge
1212 wall wash lens
1214 wall wash housing
1216 clip
1218 clip
1220 reflector flange
1502 clip
1602 clip

The invention claimed is:

1. A wall wash insert comprising:

a wall wash housing with a truncated conal shape, where the truncated conal shape is truncated at a top by a circular ridge and on a side and bottom by an elliptical opening, the elliptical opening extending from the circular ridge to the bottom of the truncated conal shape at an opposite side;

the circular ridge comprising a cylinder, open at each end, at the top of the wall wash housing, and a plurality of clips;

a lens covering the elliptical opening, the lens including a lined diffusion pattern and a plurality of raised tabs located at a junction of the lens and the wall wash housing.

2. The wall wash insert of claim 1 where the plurality of clips extend above the top of the circular ridge and extend outward in an L shape.

3. The wall wash insert of claim 2 where the plurality of clips are plastic.

4. The wall wash insert of claim 2 where the plurality of clips are metal.

5. The wall wash insert of claim 1 where the wall wash housing is configured to insert inside of a recessed lighting luminaire.

6. The wall wash insert of claim 5 where the plurality of clips are configured to snap onto a reflector flange of the recessed lighting luminaire.

7. The wall wash insert of claim 6 where the plurality of clips are configured to slide around the reflector flange as the plurality of raised tabs are used to rotate the wall wash insert.

8. The wall wash insert of claim 1 where the lens is opaque.

9. The wall wash insert of claim 1 where the lens is clear.

10. The wall wash insert of claim 1 where the lens is semi-transparent.

11. A wall wash insert comprising:

a wall wash housing with a prismatoid shape, where the prismatoid shape is truncated at a top by an octagonal ridge and on a side and bottom by a rectangular opening with two rounded sides, the two rounded sides being parallel, the rectangular opening extending from the octagonal ridge to the bottom of the prismatoid shape at an opposite side;

the octagonal ridge comprising an octagonal prism, open at each end, at the top of the wall wash housing, and a plurality of clips;

a lens covering the rectangular opening, the lens including a lined diffusion pattern and a plurality of raised tabs located at a junction of the lens and the wall wash housing.

12. The wall wash insert of claim 11 where the plurality of clips extend above the top of the octagonal ridge and extend outward in an L shape.

13. The wall wash insert of claim 12 where the plurality of clips are plastic.

14. The wall wash insert of claim 12 where the plurality of clips are metal.

15. The wall wash insert of claim 11 where the wall wash housing is configured to insert inside of a recessed lighting luminaire.

16. The wall wash insert of claim 15 where the plurality of clips are configured to snap onto a reflector flange of the recessed lighting luminaire.

17. The wall wash insert of claim 16 wherein the wall wash insert may be positioned in any 90-degree rotation orientation in the recessed lighting luminaire.

18. The wall wash insert of claim 11 where the lens is opaque.

19. The wall wash insert of claim 11 where the lens is clear.

20. The wall wash insert of claim 11 where the lens is semi-transparent.

* * * * *